United States Patent Office 3,152,178
Patented Oct. 6, 1964

3,152,178
N-ALKYL-α-α-DIARYL-β-ALKYLAMINO-PROPIONAMIDES
Harold Elmer Zaugg, Lake Forest, Robert William De Net, Waukegan, and Raymond John Michaels, Jr., Mundelein, Ill., assignors to Abbott Laboratories, North Chicago, Ill., a corporation of Illinois
No Drawing. Filed Nov. 5, 1962, Ser. No. 235,509
17 Claims. (Cl. 260—559)

This invention is concerned with new compounds of the formula

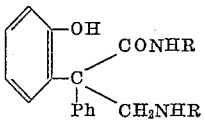

and methods for their preparation. In this and succeeding formulas, Ph is phenyl and each R is loweralkyl containing from 1 to 4 carbon atoms or cycloalkyl containing from 3 to 7 carbon atoms. These compounds are useful as analgesics for warm-blooded animals when administered orally or intravenously either per se or admixed with a conventional, non-toxic, liquid or solid carrier in a manner well known to those skilled in the art.

The compounds are conveniently prepared by the reaction of 3-bromomethyl-3-phenyl-2-benzofuranone of the formula

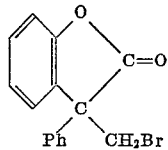

with an amine of the formula R—NH$_2$. The reaction may be carried out in the absence of a solvent provided a stoichiometric excess of the amine is employed as the hydrohalide acceptor. In a preferred method of operation, three molecular proportions of the amine are dissolved in an inert organic solvent such as cyclohexane, benzene, ethyl ether, tetrahydrofuran, 1,2-dimethoxyethane or acetonitrile and added slowly to a stirred solution of one molecular proportion of the bromide in the same solvent. Since the reaction is somewhat exothermic, the temperature should be controlled below 35° C. but not less than 0° C. When the reaction is complete, the reaction mixture is allowed to stand for 2 to 6 days at room temperature and the precipitate which forms is removed by filtration and stirred with water to dissolve the amine-hydrohalide of reaction. The water insoluble fraction is again collected at the filter, dried and recrystallized from a suitable organic solvent such as ethanol to obtain the desired propionamide product as a crystalline solid.

The following examples illustrate the invention in more detail but are not to be construed as limiting.

EXAMPLE 1

N-Cyclopropyl-β-Cyclopropylamino-α-(o-Hydroxyphenyl)-α-Phenylpropionamide

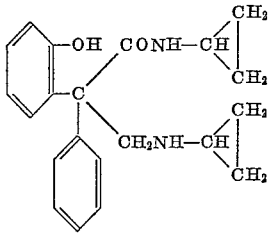

To a stirred solution of 90.0 grams (0.3 mole) of 3-bromomethyl-3-phenyl-2-benzofuranone melting at 130° C. in 450 ml. of dry benzene was added over a period of 10 minutes, a solution of 51.3 grams (0.9 mole) of cyclopropylamine in 50 ml. of dry benzene. An ice bath was used to maintain the temperature below 35° C. After standing at room temperature for 2 days, the precipitated solid was removed by filtration, stirred vigorously with 300 ml. of water for 10 minutes and the water insoluble solid was thereafter collected by filtration and dried. Upon recrystallization from ethanol, there was obtained a 46% yield of the desired N-cyclopropyl-β-cyclopropylamino-α-(o-hydroxyphenyl)-α-phenylpropionamide as a crystalline solid melting at 188°–190° C. Nitrogen calculated was 8.33% whereas the nitrogen found was 8.44%.

EXAMPLES 2–7

By substituting n-propylamine, n-butylamine, cyclobutylamine, cyclopentylamine, cyclohexylamine or cycloheptylamine for the cyclopropylamine in the procedure described in Example 1, there is obtained respectively:

N - n - propyl - β-n-propylamino-α-(o-hydroxyphenyl)-α-phenylpropionamide melting at 143°–144° C.;

N - n - butyl - β-n-butylamino-α-(o-hydroxyphenyl)-α-phenylpropionamide melting at 117°–119° C.;

N - cyclobutyl - β - cyclobutylamino-α-(o-hydroxyphenyl)-α-phenylpropionamide melting at 163°–165° C.;

N - cyclopentyl - β - cyclopentylamino - α - (o-hydroxyphenyl)-α-phenylpropionamide melting at 146°–147° C.;

N - cyclohexyl - β-cyclohexylamino-α-(o-hydroxyphenyl)-α-phenylpropionamide melting at 145°–147° C. and N - cycloheptyl - β - cycloheptylamino - α - (o-hydroxyphenyl)-α-phenylpropionamide which when reacted with oxalic acid forms a solid salt melting at 132°–133° C.

In a similar manner, methylamine or ethylamine can be reacted with 3-bromomethyl-3-phenyl-2-benzofuranone in an inert, organic solvent to obtain N-methyl-β-methylamino-α-(o-hydroxyphenyl)-α-phenylpropionamide and N-ethyl - β - ethylamino-α-(o-hydroxyphenyl)-α-phenylpropionamide respectively.

The benzofuranone employed as one of the reactants in the present invention is a known compound and its preparation is described in the Journal of Organic Chemistry, 26, 4821 (1961).

What is claimed is:
1. A compound of the formula

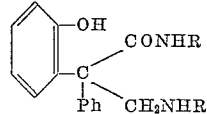

wherein Ph is phenyl and each R is a member of the group consisting of loweralkyl and cycloalkyl containing from 3 to 7 carbon atoms, inclusive.

2. N - cyclopropyl - β-cyclopropylamino-α-(o-hydroxyphenyl)-α-phenylpropionamide.

3. N - n - propyl - β - propylamino-α-(o-hydroxyphenyl)-α-phenylpropionamide.

4. N - n - butyl - β-n-butylamino-α-(o-hydroxyphenyl)-α-phenylpropionamide.

5. N - cyclobutyl - β - cyclobutylamino - α-(o-hydroxyphenyl)-α-phenylpropionamide.

6. N - cyclopentyl - β - cyclopentylamino-α-(o-hydroxyphenyl)-α-phenylpropionamide.

7. N - cyclohexyl - β - cyclohexylamino-α-(o-hydroxyphenyl)-α-phenylpropionamide.

8. N - cycloheptyl - β - cycloheptylamino-α-(o-hydroxyphenyl)-α-phenylpropionamide.

9. A method for the preparation of a compound of the formula

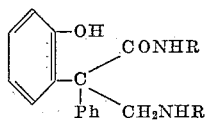

wherein Ph is phenyl and each R is a member of the group consisting of loweralkyl and cycloalkyl containing from 3 to 7 carbon atoms, inclusive which comprises reacting at a temperature of from 0° to 35° C. one molecular proportion of a compound of the formula

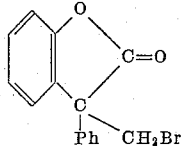

wherein Ph is phenyl with at least two molecular proportions of an amine of the formula

R—NH$_2$ wherein R is as previously defined, allowing the reaction mixture to stand at room temperature, thereafter separating and treating the precipitate which forms with water and separating the water insoluble product from the aqueous mixture.

10. A method as claimed in claim 9 in which the reaction is carried out in the presence of an inert, organic solvent.

11. A method as claimed in claim 10 in which the amine employed is cyclopropylamine.

12. A method as claimed in claim 10 in which the amine employed is n-propylamine.

13. A method as claimed in claim 10 in which the amine employed is n-butylamine.

14. A method as claimed in claim 10 in which the amine employed is cyclobutylamine.

15. A method as claimed in claim 10 in which the amine employed is cyclopentylamine.

16. A method as claimed in claim 10 in which the amine employed is cyclohexylamine.

17. A method as claimed in claim 10 in which the amine employed is cycloheptylamine.

References Cited in the file of this patent
UNITED STATES PATENTS 2,854,472     Rorig _____ Sept. 30, 1958